UNITED STATES PATENT OFFICE 2,481,959

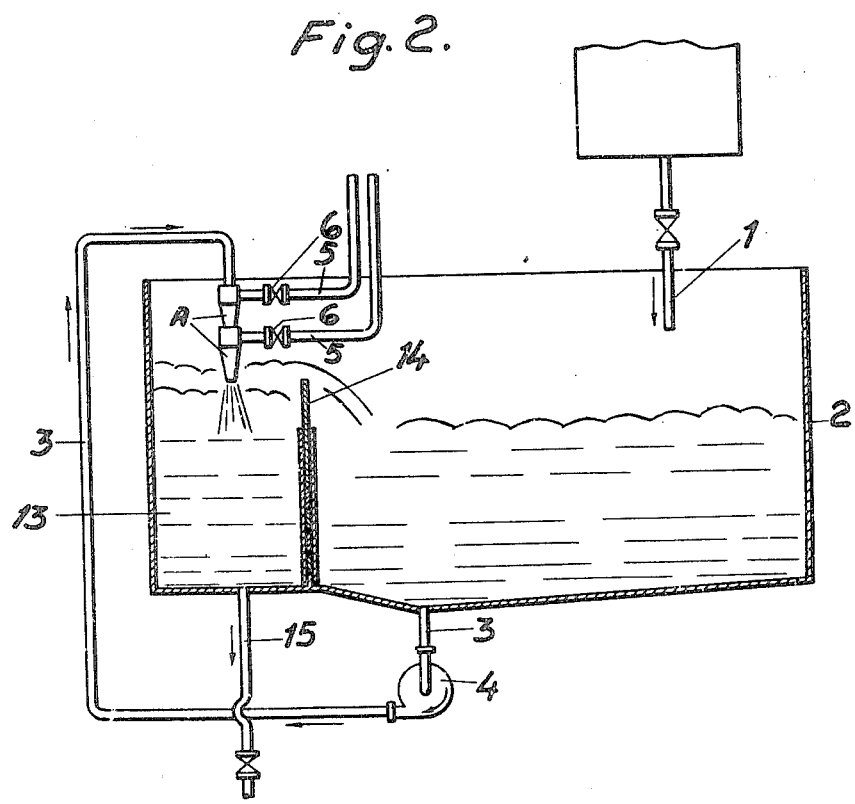

METHOD OF PRODUCING A SUSPENSION OF FIBROUS MATERIAL

Bengt Gustaf Wåhlin, Kramfors, Sweden, assignor to Svenska Cellulosa Aktiebolaget, Stockholm, Sweden Application December 21, 1945, Serial No. 636,488
In Sweden January 11, 1945

1 Claim. (Cl. 261—36)

The present invention has for its object to obtain a foamy mass of a foaming agent, e. g., sulphite residual liquor, and a fibrous material suspended in water, said foamy mass being particularly suitable for the manufacture of highly porous fibrous boards or similar products.

One object of the invention is to improve the methods hitherto used for the same purpose, according to which methods the foamy mass is produced in separate vessels provided with complicated and expensive stirring propellers or the like and corresponding driving means, said stirrers being destroyed rapidly on account of the permanent wear.

The method according to the present invention chiefly consists therein that the fibrous suspension containing the foaming agent is caused to pass through a conduit provided with a foaming section having air inlets and means for imparting a rotating or whirling motion to the suspension, while sucking in air through the air inlets so that the suspension when leaving the conduit has been transformed into a foamy mass.

In order to obtain a thorough agitation of the fibrous suspension, which is suitable for the homogeneity of the foamy mass the fibrous suspension together with the foaming agent and the sucked in air are preferably subjected to a repeated compression and expansion by being forced successively through constricted and expanded portions arranged alternatingly in the foaming section.

The invention also relates to an apparatus for carrying out the abovementioned method. Said apparatus comprises a supply pipe for the fibrous suspension and the foaming agent which pipe is provided with a foaming section having one or more preferably adjustable members for imparting a whirling or rotary motion to the suspension when passing through the pipe. Further, the foaming section is provided with two or more constricted portions and with two or more expanded portions so that the suspension when passing through the foaming section will be compressed and expanded two times or more. At each constricted portion there is provided an air inlet so that air will be sucked in as the suspension leaves the compressed portions.

The accompanying drawings illustrate the invention diagrammatically.

Fig. 2 shows on a smaller scale an apparatus for carrying out the method according to the invention.

Figure 1:
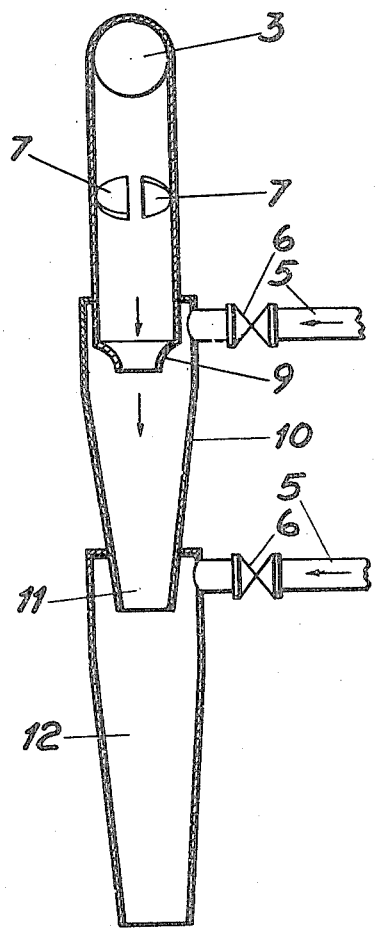
Fig. 1 is a sectional view of the foaming section.

The fibrous suspension and the foaming agent are supplied through a conduit 1 which opens into a container 2. From the bottom of the container there emanates a conduit 3 provided with a pump 4 which sucks the liquid close to the bottom of the container 2 out through the conduit 3 and causes the same to pass through a foaming section (A in Fig. 2) provided in the conduit 3. This foaming section is shown on a larger scale in Fig. 1 and is provided with two air inlet conduits 5 having controlling valves 6 and with members 7 for imparting a whirling or rotary motion to the liquid passing through the foaming section. In the drawing two such members 7 are shown in the form of semicircular discs which are situated opposite each other in the conduit 3 and obliquely positioned in the opposite directions so that they form guiding members for the liquid. The conduit 3 is provided with a constricted portion 9 and opens into one end portion of a nozzle 10 expanded relatively to the constricted portion 9 said nozzle 10 being constricted at its other end portion 11 and in its turn opening into the expanded end portion of another nozzle 12 formed in the same manner as the nozzle 10. As will appear from Fig. 1 the air inlet conduits 5 are arranged at the constricted portions 9 and 11.

The fibrous suspension and the foaming agent supplied through the conduit 3 are brought into a rotary motion when passing the members 7 so that the suspension after passing the compressed portion 9 will be thrown out against the inner circumference of the nozzle 10. Air is thereby sucked in through the adjacent conduit 5. When the liquid jet is then compressed in the narrower portion of the nozzle 10 (the constricted portion 11) part of the entrained air is dissolved momentarily in the suspension on account of the increased pressure to reappear immediately in the form of small air bubbles when the jet is again extended when flowing into the nozzle 12. The jet being compressed and expanded two times when passing through the foaming section the fibrous material is subjected to an intense agitation, a great number of small air bubbles being now again obtained. The rotary motion imparted to the liquid by means of the members 7 is maintained in part during the passage through the nozzles 10 and 12. The formed foamy mass flows from the final nozzle 12 down into a foam container 13 in which an intense stirring treatment takes place only by the action of the jet from the nozzle 12. When the foamy mass in the container 13 has ascended to a certain height it overflows a wall 14 into the container 2. The foamy mass is discharged from the container 13 by means of a conduit 15.

The pump may work continuously independent of the discharges through the conduits 1 and 15. The rate of discharge through the conduit 15, however, ought to be less than the capacity of the pump.

The two member 7 imparting the rotary motion to the liquid may preferably be adjustable separately and may, while maintaining the intended function, be shaped in different ways so as to obtain a guiding action. For stirring the liquid a single damper-like member, which is adjustable by turning, may be used.

Having now described my invention, what I claim as new and desire to secure by Letters Patent is:

Method of producing a stream of foamy suspension of fibrous material in an aqueous liquid containing a foaming agent, for use in forming highly porous fibrous boards and similar products, which comprises establishing a body of an aqueous suspension of fibers including a foaming agent, continuously withdrawing from adjacent the bottom of said body a stream of said suspension, imparting rotary as well as translational motion to said stream, subjecting the rotating stream to an intense agitation in the presence of air by repeatedly constricting said stream and expanding the same in the presence of air, whereby air is introduced into said stream, jetting the resulting intensely agitated and foamy stream through air into said body of said suspension, continuously withdrawing foamy suspension from said body while the same is maintained in agitated foamy condition by said jetted stream, and continuously adding fresh aqueous suspension of fibers including a foaming agent to said body to maintain the latter.

BENGT GUSTAF WAHLIN.

REFERENCES CITED

The following references are of record in the file of this patent:

UNITED STATES PATENTS

| Number | Name | Date |
|---|---|---|
| 1,995,540 | Harrison | Mar. 26, 1935 |
| 2,128,311 | Mertes | Aug. 30, 1938 |
| 2,183,561 | Hamblin | Dec. 19, 1939 |
| 2,324,605 | Urquhart | July 20, 1943 |
| 2,375,833 | Urquhart | May 15, 1945 |

FOREIGN PATENTS

| Number | Country | Date |
|---|---|---|
| 441,441 | Great Britain | Jan. 20, 1936 |
| 467,359 | Great Britain | June 16, 1937 |